(12) United States Patent
Yang

(10) Patent No.: US 8,130,318 B2
(45) Date of Patent: Mar. 6, 2012

(54) METHOD AND AUDIO/VIDEO DEVICE FOR GENERATING RESPONSE DATA RELATED TO SELECTED CAPTION DATA

(75) Inventor: Yunfeng Yang, Aurora, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 818 days.

(21) Appl. No.: 12/210,747

(22) Filed: Sep. 15, 2008

(65) Prior Publication Data

US 2010/0066903 A1    Mar. 18, 2010

(51) Int. Cl.
  *H04N 7/00* (2006.01)
  *H04N 5/50* (2006.01)
(52) U.S. Cl. .............................. 348/468; 348/569
(58) Field of Classification Search .................. 348/468, 348/461, 462, 465, 467, 569, 589, 600; 345/629, 345/636; 704/2, 277, 10; 386/245; *H04N 9/74, H04N 9/76, 7/00, 11/00, 5/50*
See application file for complete search history.

(56) References Cited

U.S. PATENT DOCUMENTS

| | | | | |
|---|---|---|---|---|
| 7,679,677 | B2 * | 3/2010 | Park et al. | 348/468 |
| 2007/0091208 | A1 * | 4/2007 | Kim | 348/468 |
| 2007/0230894 | A1 * | 10/2007 | Kimura et al. | 386/35 |

* cited by examiner

*Primary Examiner* — Sherrie Hsia
(74) *Attorney, Agent, or Firm* — Dorsey & Whitney LLP

(57) ABSTRACT

A method for operating an audio/video device is presented. In the method, audio/video data, and caption data associated with the audio/video data, is received. The audio/video data is presented for display. An indication of a portion of the caption data is also received into the audio/video device. In response to receiving the indication, response data describing the indicated portion of the caption data is generated and presented for display.

22 Claims, 6 Drawing Sheets

METHOD AND AUDIO/VIDEO DEVICE FOR GENERATING RESPONSE DATA RELATED TO SELECTED CAPTION DATA

BACKGROUND

Many audio/video programs, including movies, sporting events, newscasts, and the like, provide captioning (often referred to as "closed captioning") information, which is typically embedded within a signal carrying the video and audio data for the audio/video program. Many types of devices that provide such audio/video programming to a user, including televisions, digital video disc (DVD) players, and set-top boxes, are often required by way of government regulation to offer this captioning information in conjunction with the video portion of the programming at the option of the user. For example, if the user configures the device (typically by way of a menu system provided by the device) to display closed captioning information, the device presents the video portion of the program along with the captioning on a display, such as a television or monitor screen. Typically, the captioning is a textual representation of the dialogue and other elements of the audio data accompanying the video portion of the program, and its presentation is generally synchronized with the program audio data.

While this captioning data is typically regarded as an aid to those users with hearing impairments, viewers for whom the spoken words of the program audio portion are not in the primary language of the viewer often find that viewing the captioning information enhances or augments their comprehension of the program.

BRIEF DESCRIPTION OF THE DRAWINGS

Many aspects of the present disclosure may be better understood with reference to the following drawings. The components in the drawings are not necessarily depicted to scale, as emphasis is instead placed upon clear illustration of the principles of the disclosure. Moreover, in the drawings, like reference numerals designate corresponding parts throughout the several views. Also, while several embodiments are described in connection with these drawings, the disclosure is not limited to the embodiments disclosed herein. On the contrary, the intent is to cover all alternatives, modifications, and equivalents.

DETAILED DESCRIPTION

The enclosed drawings and the following description depict specific embodiments of the invention to teach those skilled in the art how to make and use the best mode of the invention. For the purpose of teaching inventive principles, some conventional aspects have been simplified or omitted. Those skilled in the art will appreciate variations of these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1:
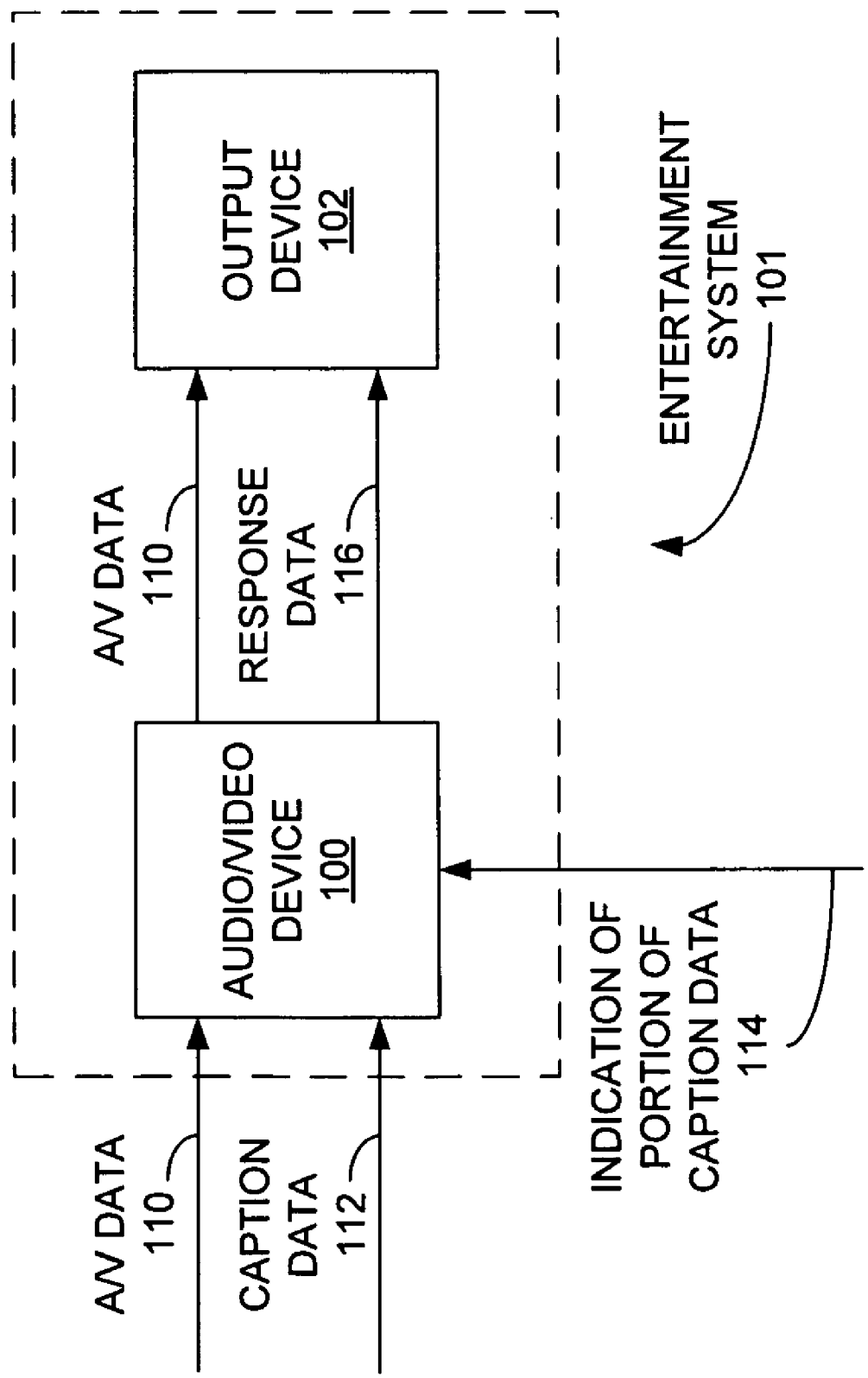
FIG. 1 is a block diagram of an entertainment system including an audio/video device according to an embodiment of the invention.

FIG. 1 is a simplified depiction of an entertainment system 101 including an audio/video device 100 according to an embodiment of the invention. Examples of the audio/video device 100 include, but are not limited to, television sets or monitors; television set-top boxes for satellite, cable, and terrestrial broadcast systems; digital video disc (DVD) players; digital video recorders (DVRs); and computer systems, as well as any other device capable of presenting audio/video programming for display to a user. The audio/video device 100 is coupled with an output device 102, such as a television or monitor. While the output device 102 is displayed as being physically separate from the audio/video device 100, the two components 100, 102 may be integrated as a single system, such as in a television or laptop computer.

Figure 2:
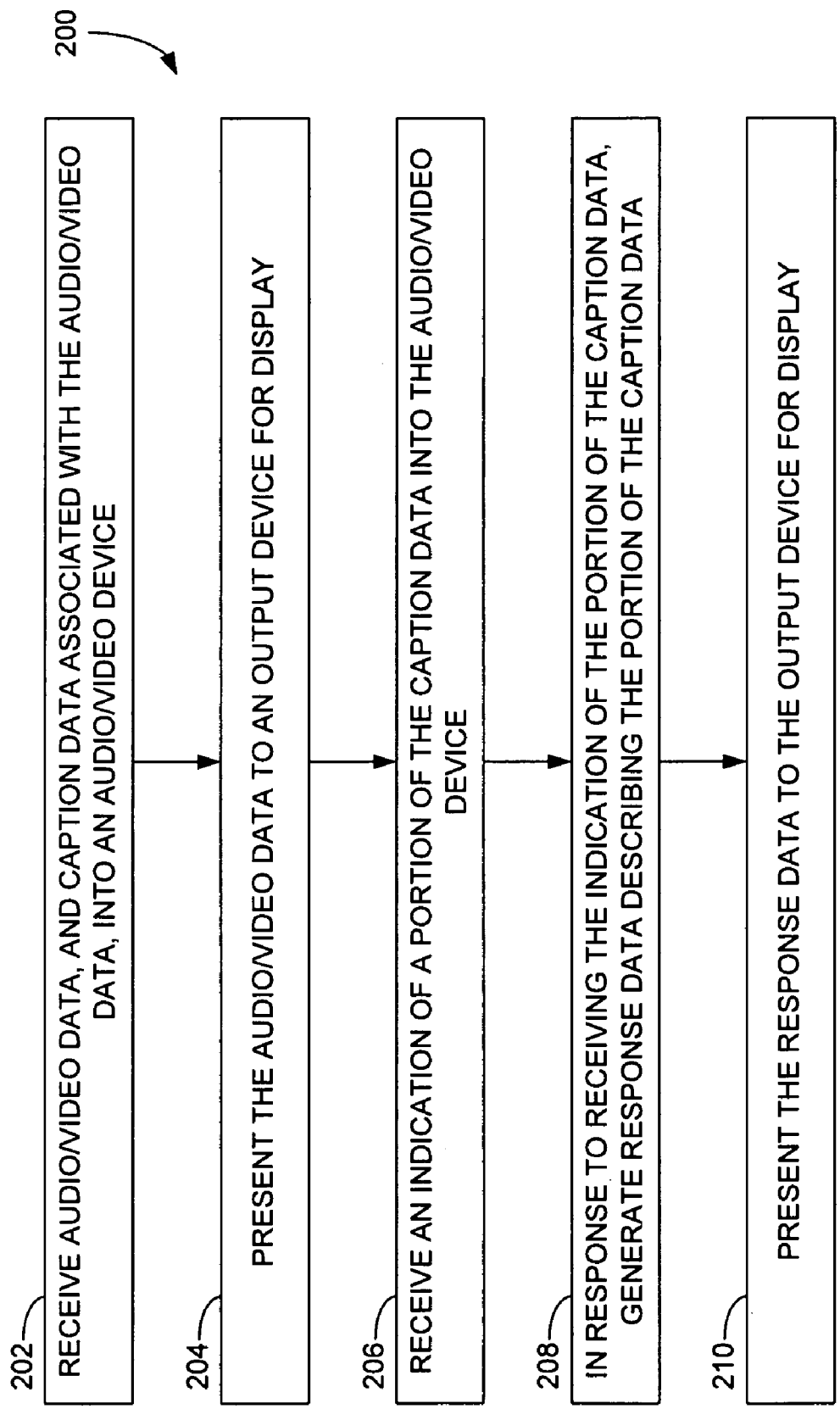
FIG. 2 is a flow diagram of a method according to an embodiment of the invention for operating the audio/video device of FIG. 1.

FIG. 2 provides a flow diagram of a method 200 for operating the audio/video device 100 of FIG. 1. However, the method 200 may be employed on other similar devices not specifically described herein.

In the method 200, audio/video data 110, as well as caption data 112 associated with the audio/video data 110, is received into the audio/video device 100 (operation 202). The audio/video data 110 is presented to the output device 102 for display (operation 204). In one implementation, the audio/video data 110 may be reformatted or otherwise altered by the audio/video device 100 before presentation for display. An indication 114 of a portion of the caption data 112 is also received into the audio/video device 100 (operation 206). In response to receiving the indication 114 of the portion of the caption data 112, response data 116 describing the portion of the caption data 112 is generated (operation 208). The response data 116 is presented to the output device 102 for display (operation 210). While FIG. 2 indicates a specific order of execution of the operations 202-210, other possible orders of execution, including concurrent execution of one or more operations 202-210, may be undertaken in other implementations. In another embodiment, a computer-readable storage medium may have encoded thereon instructions for a processor to direct the audio/video device 100 to implement the method 200.

Thus, use of one or more of the embodiments described herein may facilitate a viewer's comprehension or appreciation of a viewed program by offering additional description of the caption data, and thus the spoken words, appearing in the program.

Figure 3:
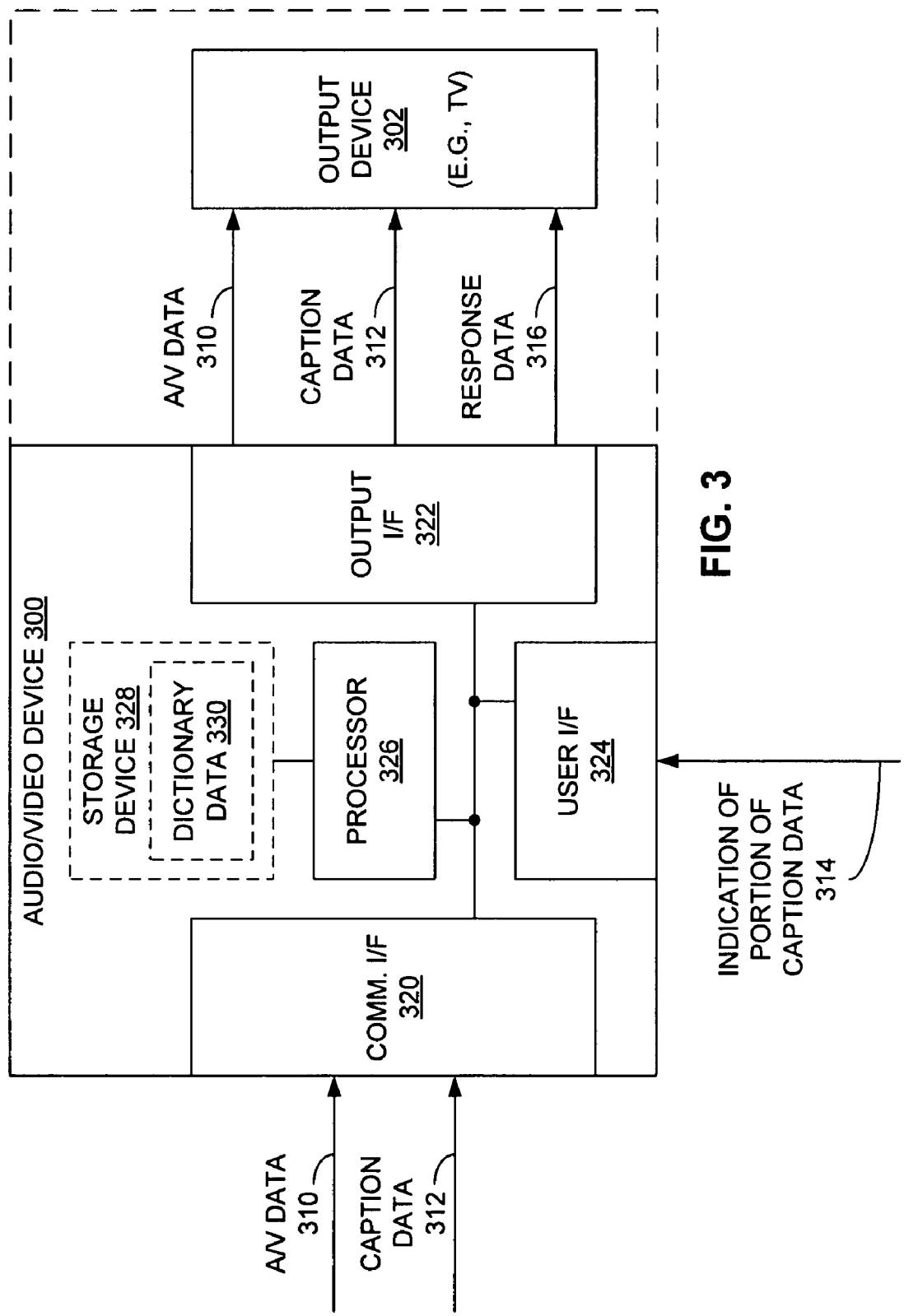
FIG. 3 is a block diagram of an audio/video device according to an embodiment of the invention.

FIG. 3 provides a block diagram of an audio/video device 300 according to another embodiment of the invention. The audio/video device 300 includes at least a communication interface 320, an output interface 322, a user interface 324, and a processor 326. Optionally, the audio/video device 300 may include a storage device 328, described in greater detail below.

As with the audio/video device 100 of FIG. 1, examples of the audio/video device 300 of FIG. 3 include, but are not limited to, satellite, cable and terrestrial television set-top boxes; television sets, monitors, and video displays; digital video disc (DVD) players; digital video recorders (DVRs); and computers. As a result, circuitry normally associated with such devices may be present in the audio/video device 300, but is not explicitly illustrated in FIG. 3. For example, in the case of a satellite set-top box, the audio/video device 300 may include one or more tuners, as well as descrambling and decoding circuitry, in the communication interface 320. The audio/video device 300 may also incorporate DVR functionality, as well as other circuitry typically incorporated into satellite set-top boxes, that is not shown in FIG. 3. Such detail is not described or depicted in FIG. 3 to simplify and facilitate the following discussion.

The audio/video device 300 is coupled with an output device 302, such as a television set, monitor, or the other video display. While the output device 302 is displayed as being physically separate from the audio/video device 300, the two devices 300, 302 may be integrated as a single system, such as in a television set or laptop computer system.

The communication interface 320 of the audio/video device 300 is configured to receive audio/video data 310, as well as caption data 312 associated with the audio/video data 310. The communication interface 320 may take any number of forms depending on the type of audio/video device 300. For example, if the audio/video device 300 is a satellite set-top box, the communication interface 320 may include circuitry for receiving a satellite signal from an antenna, down-converting the signal, selecting a particular transponder frequency, descrambling and/or decoding the data packets of the signal, selecting those data packets associated with a particular programming channel, and so on. If, instead, the audio/video data 300 is a DVD player, the communication interface 320 may be a laser diode and related servo circuitry, along with read synchronization and decoding circuitry, to enable the audio/video device 300 to read the audio/video data 310 and associated caption data 312 from a DVD. As a result, the communication interface 320 may receive the audio/video data 310 and the caption data 312 from any of a number of sources, including, but not limited to, a satellite, a cable, a terrestrial source, a digital storage medium, and a computer network or other communication network.

In one implementation, the audio/video data 310 may incorporate one of the Motion Picture Experts Group (MPEG) standards for data encoding and compression, such as MPEG-2 or MPEG-4. Other data formatting or encoding methods, both analog and digital, may be employed in other embodiments.

In one example, the caption data 312 of FIG. 3 may conform to either of the closed captioning standards developed by the Electronics Industry Alliance (EIA), such as the EIA-608 standard for NTSC (National Television System Committee) standard-definition television broadcasts, or the EIA-708 standard for ATSC (Advanced Television Systems Committee) high-definition television broadcasts in both the United States and Canada. Other captioning formats, including those implemented according to standards supported by countries other than the United States and Canada, may be utilized for the caption data 312 in other embodiments.

The output interface 322 of the audio/video device 300 is configured to transmit at least the audio/video data 310 received by the communication interface 320 to the output device 302. Typically, the output interface 322 is configured to reformat the received audio/video data 310 so that the audio/video data 310 may be processed by the output device 302 for presentation to a user. For example, the audio/video data 310 may take the form of audio and video data suitable for transport over one or more of several audio/video connections, including, but not limited to, coaxial cable, composite video with separate audio channels, component video with separate audio channels, and the High-Definition Multimedia Interface (HDMI).

The user interface 324 depicted in FIG. 3 is configured to receive an indication of a portion of the caption data 312 that is received by the communication interface 320. In one example, the user interface 324 may be implemented as a user panel located on the audio/video device 300; a remote control interface adapted to receive commands electrically, optically, acoustically, or by other means from a remote control device (not shown in FIG. 3); or by any other form of user control over the audio/video device 300.

Within the audio/video device 300, communicatively coupled with each of the communication interface 320, the output interface 322, and the user interface 324, is a processor 326. In one embodiment, the processor 326 may be one or more microprocessors, microcontrollers, digital signal processors (DSPs), or any other processor configured to execute software instructions for performing the various tasks identified with the processor 326, such as coordinating the activities of the other components of the audio/video device 300, as well as the specific operations discussed in greater detail below. The software may be stored in a data storage device, such as the storage device 328 shown in FIG. 3, or a memory located internal to the processor 326. In another example, the processor 326 may be a collection of hardware logic circuitry to perform the functions described below, or a combination of software and hardware elements.

The storage device 328, if included in the audio/video device 300, may incorporate one or more types of data storage, such as static random access memory (SRAM), dynamic random access memory (DRAM), flash memory, or other integrated circuit (IC) based memory; optical or magnetic disk memory; or any other type of storage device or system capable of storing data. In another embodiment, the storage device 328 may include network-attached storage to which the audio/video device 300 may be coupled through the communication interface 320 or other suitable connection.

Through the user interface 324, a user may also configure the audio/video device 300 to transmit the caption data 312 to the output device 302 for presentation to the user. Typically, the caption data 312 is displayed as alphanumeric text, and possibly special-purpose characters, in a graphics box displayed over a portion of the video being presented to the user on the output device 302. Whether the caption data 312 is displayed on the output device 302 is typically determined by the user via a menu selection or other means provided by the audio/video device 300 through the user interface 324. The choice to display the caption data 312 is often made by individuals possessing hearing impairments, as well as those viewers for whom the language of the viewed program may be difficult to understand, especially at the rate of normal conversation.

Figure 4:
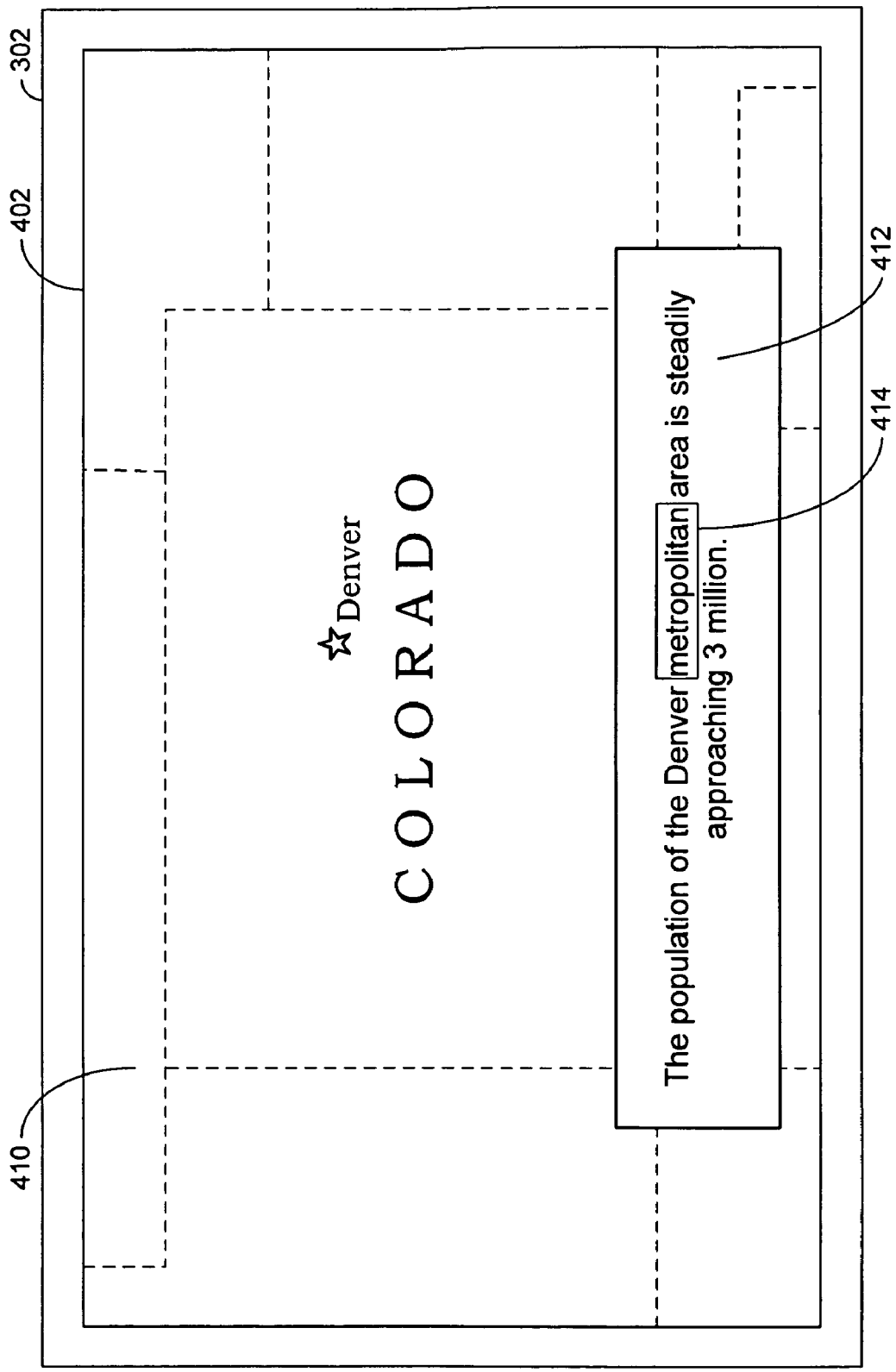
FIG. 4 is a graphical representation of the display of the output device of FIG. 3 when a user is selecting a portion of caption data according to an embodiment of the invention.

As mentioned above, the user of the audio/video device 300 may indicate a portion, such as a word, phrase, or sentence, of the caption data 312 of interest to the user. Any of several methods may be employed to allow the user to select the portion of the caption data 312 by way of the user interface 324 operating in conjunction with the processor 326. For example, if the caption data 312 is being displayed on the output device 302, the user may employ the user interface 324 to highlight or otherwise denote one or more words of the displayed caption data 312. FIG. 4 provides an example of the output device 302 with a video display 402, upon which video data 410 of a program is being displayed. Presented with the video data 410 is caption data 412 associated with the video data 410. In this particular example, the viewer or user has indicated an interest in the word 414 "metropolitan", which the user has highlighted by way of a remote control device in communication with the user interface 324 of the audio/video device 300. In one embodiment, the user may implement "directional" (e.g., 'up', 'down', 'left', and 'right') keys, along with possibly an 'enter' key and other buttons of the remote control device to navigate within the caption data 412. In one implementation, the user may also pause the presentation of the video data 410 on the display 402 to allow the user ample time to select the word 414 of interest. In other examples, more than one word, such as a phrase or sentence, may be selected.

In another embodiment, the user may instead employ the remote control to signify the first one or more letters of a word or phrase of interest that the user may have heard in the dialogue of the audio/video data 310 of the program being presented on the output device 302. For example, the user may navigate a graphical presentation of a virtual "keyboard" presented by the processor 326 of the audio/video device 300 via the output device 302 with the remote control directional keys, with the user selecting each of the letters of the word in succession to begin spelling the word.

In another alternative, the user may employ various keys of the remote control device to spell the word of interest. For example, each of the numeric keys of the remote control may be associated with several letters (e.g., 'a', 'b', and 'c' for the number '2', 'd', 'e', and 'f' for the number '3', and so on), as is common with landline and cellular telephones. Each letter may then be specified by one or more presses on an associated numeric key to specify the current letter of the word. In another arrangement, more advanced typing techniques, such as the 'T9' ("Text on 9 keys") predictive technology used primarily in cell phones, may be employed to allow the user to spell the word of interest.

Figure 5:
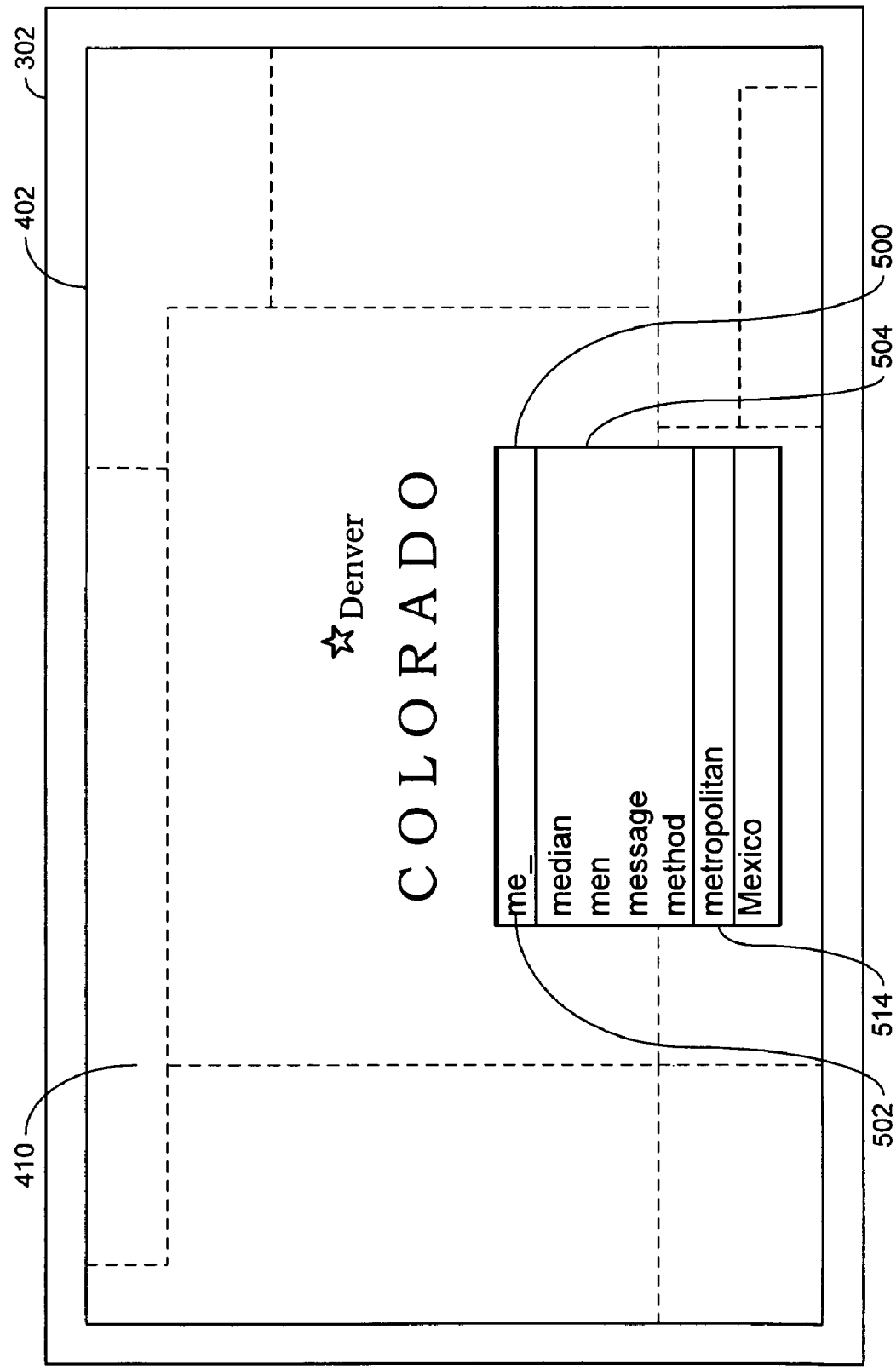
FIG. 5 is a graphical representation of the display of the output device of FIG. 3 when a user is selecting a portion of caption data according to another embodiment of the invention.

FIG. 5 provides an example view of the video display 402 of the output device 302 after the user has typed a partial word 502 (in this case, the first two letters "me" of the word "metropolitan") into a data entry area 500 of the display 402. In one implementation, the user may instantiate the data entry area 500 by a key press, menu selection, or other means via the remote control device. In response, the processor 326 may cause a list 504 of potential words searched from the caption data 312 that match the letters entered thus far to be displayed on the display 402 by way of the output interface 322. As more letters are entered, the list 504 may shorten as fewer words from the list 504 match. At any point during this process, the user may utilize the remote control to navigate the list 504 and select one of the words from the list 504, such as by way of the remote control directional keys, to select the word 514 of interest (in this case, the word "metropolitan").

Although several specific methods by which the user may select the word of interest from the caption data 312 of FIG. 3 have been described above, other techniques not disclosed herein may be employed in other implementations to allow the user to specify or indicate the word, phrase, or sentence of interest from the caption data 312.

Continuing with FIG. 5, in addition to generating the list 504 from a search of the words provided in the caption data 312, the processor 326 may also generate at least some words of the list 504 by way of a search of dictionary data 330 previously stored in the storage device 328 of the audio/video device 300. In one example, the dictionary data 330 may be downloaded to the audio/video device 300 by way of the communication interface 320 or another interface not specifically indicated in FIG. 3, with the processor 326 storing the received dictionary data 330 in the storage device 328. In addition, the dictionary data 330 may be updated periodically in the same manner. For example, in the case of a satellite set-top box, the communication interface 320 may receive the dictionary data 330, including updates, from a satellite uplink center by way of one or more transponders of a satellite. The updates may occur in a fashion similar to that by which an electronic program guide (EPG) of the set-top box may be updated. Other communication connections, such as cable, telephone, and computer network connections, may be employed to similar end.

The dictionary data 330 may include a searchable collection of words or phrases, with each word or phrase associated with some description of the word or phrase. The description of the word or phrase may take any of several different forms, as is discussed in greater detail below.

In response to the processor 326 receiving the indication of the portion of the caption data 312 via the user interface 324, the processor 326 is configured to generate response data 316 indicative of the selected portion of the caption data 312. In one implementation, the processor 326 searches the dictionary data 330 in the storage device 328 for the selected portion of the caption data 312, and retrieves data associated in the dictionary data 330 as the response data 316.

In another implementation, the processor 326 may issue a request for data indicative of the selected portion of the caption data 312 by way of the communication interface 320 or another interface not explicitly illustrated in FIG. 3. For example, in the case of the audio/video device 300 being a satellite set-top box, the processor 326, upon receiving the indication of the selected portion of the caption data 312, may issue the request over a telephone line or other network connection (which may be considered a part of the communication interface 320) to a database or dictionary maintained by the service provider of the satellite programming. In response to the request, the service provider may return some indication or description of the selected portion of the caption data 312 over the communication interface 320 to the processor 326 to be used as the response data 316. Exclusive use of this particular embodiment may eliminate the need for maintaining the dictionary data 330 in the storage device 328 of FIG. 3. In further examples, other entities aside the service provider may receive and respond to the request from the audio/video device 300.

Figure 6:
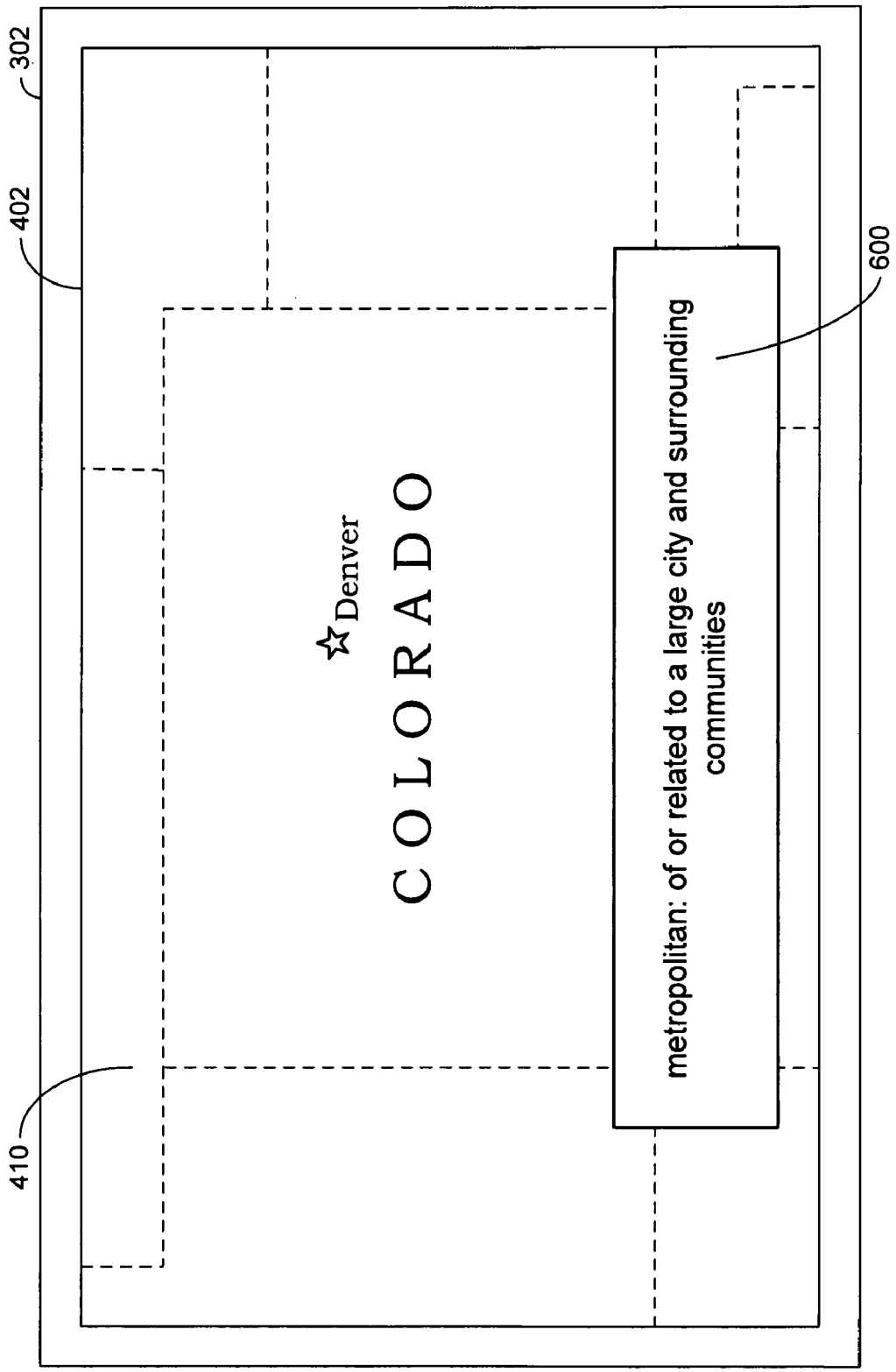
FIG. 6 is a graphical representation of the display of the output device of FIG. 3 when presenting response data to a user according to an embodiment of the invention.

After generating the response data 316, the processor 316 transfers the response data 316 to the output interface 322, which then transmits the response data 316 to the output device 302 for presentation to the user. The response data 316 may take any of several forms. FIG. 6 provides an illustration of one such form. In the video display 402 of the output device 302, the processor 326, by way of the output interface 322, may cause a definition 600 of the selected word or phrase from the caption data 316 to be displayed textually as part of the video data 410 on the display 402. In the particular example of FIG. 6, a basic definition 600 of the selected word "metropolitan" is presented to the user. Typically, the definition 600 is presented in the same language as the selected portion of the caption data 312.

In another embodiment, the response data 316 may instead be a textual translation of the selected portion of the caption data 312 from the language of the selected portion to a different language. For example, in the case of FIG. 6, instead of providing an English definition of "metropolitan", the processor 326 may instead provide the German or Chinese word for "metropolitan" via the output interface 322 to the output device 302. In this context, the user interface 324 and the processor 326 may be configured to allow the user, by way of a menu selection or other means, to select both the type of response data 316 (definition, translation, or other form) and the desired language of the response data 316 if a translation is requested.

Another form of the response data 316 may be graphical data representing the selected portion of the caption data 312. The graphical data may be a simplistic rendering, such as an icon, representing or describing the selected word or phrase. In another example, the graphical data may be a more detailed representation of the selected portion of the caption data 312, such as a JPEG (Joint Photographic Experts Group) file. In other embodiments, a short video and/or audio segment describing the selected word or phrase may be presented by the processor 326 via the output interface 322 to the output device 302.

In addition to the actions discussed above, in response to receiving the indication of the selected portion of the caption data 312 via the user interface 324, the processor 326 may also cause at least the section of the audio/video data 310 including the selected portion of the caption data 312 to be repeated or replayed on the output device 302 via the output interface 322. Further, the user may control or instigate such functionality by way of the user interface 324. The caption data 312 associated with the repeated portion of the audio/video data 310 may be presented on the output device 302 as well.

Additionally, the processor 326 of the audio/video device 300 may be configured to periodically present on the output device 302 a word or phrase, such as from either the dictionary data 330 or the communication interface 320, along with a definition or other description of the word or phrase, without prompting from the user. More specifically, the processor 326 may present a "daily word", accompanied by a definition or translation of that word, to the user whenever the user first accesses the audio/video device 300 over the user interface 324, thus helping to improve the vocabulary of the user.

Various embodiments as described herein may provide a number of benefits. By allowing a user to select a word or phrase encountered in a viewed program from the closed captioning data associated with that program, and, in response to that selection, providing some description, such as a definition, translation, or graphical representation of that word or phrase, the audio/video device becomes a language learning tool in addition to an entertainment component. By combining language education with entertainment, such education may become more enjoyable and efficient than rote memorization of vocabulary.

While several embodiments of the invention have been discussed herein, other embodiments encompassed by the scope of the invention are possible. For example, while various embodiments have been described primarily within the context of satellite set-top boxes, any other device that provides captioning data, such as cable and terrestrial set-top boxes, television sets and monitors, DVD players, and various computer systems, may benefit from application of the various concepts described herein. In addition, aspects of one embodiment disclosed herein may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

What is claimed is:

1. A method of operating an audio/video device, the method comprising:
   receiving audio/video data and caption data associated with the audio/video data into the audio/video device;
   presenting the audio/video data for display;
   receiving an indication of a portion of the caption data into the audio/video device;
   in response to receiving the indication of the portion of the caption data, generating response data describing the portion of the caption data; and
   presenting the response data for display.

2. The method of claim 1, wherein the response data is textual data indicating a definition of the portion of the caption data.

3. The method of claim 1, wherein the response data is textual data indicating a translation of the portion of the caption data, wherein a language of the response data is different from a language of the caption data.

4. The method of claim 1, wherein the response data is graphical data representing the portion of the caption data.

5. The method of claim 1, further comprising:
   in response to receiving the indication of the portion of the caption data, presenting a portion of the audio/video data associated with the portion of the caption data for display.

6. The method of claim 1, wherein the portion of the caption data comprises at least one word of the caption data.

7. The method of claim 1, further comprising:
   receiving into the audio/video device dictionary data; and
   storing the dictionary data in at least one of the audio/video device and a storage device coupled with the audio/video device.

8. The method of claim 7, wherein generating the response data comprises:
   searching for the portion of the caption data in the dictionary data; and
   retrieving the response data from the dictionary data based on the searching.

9. The method of claim 7, further comprising:
   receiving an indication of textual data not included in the caption data;
   searching for the textual data in the dictionary data; and
   retrieving second response data describing the textual data based on the searching.

10. The method of claim 1, further comprising:
    presenting the caption data for display;
    wherein receiving the indication of the portion of the caption data occurs by way of a selection of the portion of the caption data from the displayed caption data.

11. The method of claim 1, further comprising:
    receiving an indication of at least one text character; and
    presenting for display a plurality of words corresponding to the indicated text character;
    wherein receiving the indication of the portion of the caption data occurs by way of a selection of one of the displayed plurality of words.

12. A non-transitory computer-readable storage medium having encoded thereon instructions for a processor of an audio/video device to direct the audio/video device to perform a method comprising:
    receiving audio/video data and caption data associated with the audio/video data into the audio/video device;
    transmitting the audio/video data to an output device coupled with the audio/video device;
    receiving an indication of a portion of the caption data into the audio/video device;

in response to receiving the indication of the portion of the caption data, generating response data indicative of the portion of the caption data; and transmitting the response data to the output device.

13. An audio/video device, comprising:

a communication interface configured to receive audio/video data and caption data corresponding to the audio/video data;

an output interface configured to transmit the audio/video data to an output device;

a user interface configured to receive an indication of a portion of the caption data; and a processor configured to receive the caption data from the communication interface and the indication of the portion of the caption data from the user interface, generate response data indicative of the portion of the caption data, and transfer the response data to the output interface;

wherein the output interface is configured to transmit the response data to the output device.

14. The audio/video device of claim 13, further comprising the output device.

15. The audio/video device of claim 13, further comprising:

a storage device;

wherein the communication interface is configured to receive dictionary data;

wherein the processor is configured to store the dictionary-data from the communication interface into the storage device, and wherein the processor is configured to generate the response data by searching the portion of the caption data in the dictionary data, and retrieving the response data from the dictionary data based on the searching.

16. The audio/video device of claim 13, wherein:

the response data comprises at least one of textual data and graphical data describing the portion of the caption data.

17. The audio/video device of claim 13, wherein:

the user interface is configured to receive the indication of the portion of the audio/video data from a remote control device.

18. The audio/video device of claim 13, wherein:

the communication interface is configured to receive the audio/video data and the caption data from a satellite.

19. The audio/video device of claim 13, wherein:

the communication interface is configured to receive the audio/video data and the caption data from a cable.

20. The audio/video device of claim 13, wherein:

the communication interface is configured to receive the audio/video data and the caption data from a terrestrial source.

21. The audio/video device of claim 13, wherein:

the communication interface is configured to receive the audio/video data and the caption data from a digital data storage medium.

22. The audio/video device of claim 13, wherein:

the communication interface is configured to, receive the audio/video data and the caption data from a communication network.

* * * * *